United States Patent
Standaert et al.

(10) Patent No.: US 10,501,615 B2
(45) Date of Patent: Dec. 10, 2019

(54) BIMODAL POLYPROPYLENE AND PROCESS FOR THE PREPARATION THEREOF

(71) Applicant: Total Research & Technology Feluy, Seneffe (Feluy) (BE)

(72) Inventors: Alain Standaert, Brussels (BE); Kristien Roegiers, Duffel (BE); Aurélien Vantomme, Mignault (BE)

(73) Assignee: Total Research & Technology Feluy, Seneffe (BE)

( * ) Notice: Subject to any disclaimer, the term of this patent is extended or adjusted under 35 U.S.C. 154(b) by 213 days.

(21) Appl. No.: 15/542,846

(22) PCT Filed: Jan. 22, 2016

(86) PCT No.: PCT/EP2016/051353
§ 371 (c)(1),
(2) Date: Jul. 11, 2017

(87) PCT Pub. No.: WO2016/116606
PCT Pub. Date: Jul. 28, 2016

(65) Prior Publication Data
US 2018/0340058 A1    Nov. 29, 2018

(30) Foreign Application Priority Data

Jan. 23, 2015  (EP) .................................... 15152333

(51) Int. Cl.
*C08L 23/12* (2006.01)
*C08L 23/14* (2006.01)
*C08K 5/00* (2006.01)

(52) U.S. Cl.
CPC ............ *C08L 23/12* (2013.01); *C08K 5/0083* (2013.01); *C08L 23/142* (2013.01); *C08L 2201/10* (2013.01); *C08L 2205/025* (2013.01); *C08L 2308/00* (2013.01); *C08L 2314/06* (2013.01)

(58) Field of Classification Search
CPC .... C08L 23/12; C08L 23/142; C08L 2201/10; C08L 2205/025; C08L 2308/00; C08L 2314/06; C08K 5/0083
See application file for complete search history.

(56) References Cited

U.S. PATENT DOCUMENTS

| 6,569,945 B2* | 5/2003 | Bugada et al. ......... C08L 23/12 428/373 |
| 2006/0154064 A1* | 7/2006 | Sartori et al. ........... C08L 23/14 428/374 |

FOREIGN PATENT DOCUMENTS

| EP | 0277004 A1 | 8/1988 |
| EP | 0427696 A2 | 5/1991 |
| EP | 2386603 A1 | 11/2011 |
| EP | 2386604 A1 | 11/2011 |
| EP | 2746336 A1 | 6/2014 |
| WO | 2012072776 A1 | 6/2012 |

OTHER PUBLICATIONS

International Search Report issued in PCT/EP2016/051353, dated Apr. 13, 2016, 3 pages.
Razavi et al., The Geometry of the Site and its Relevance for Chain Migration and Stereospecificity, Macromol. Symp., vol. 89, pp. 345-367, 1995.
H. N. Cheng, 13C Nuclear Magnetic Resonance Characterization of poly(propylene) Prepared with Homogeneous Catalysts, J. Ewen, Makromol. Chem., vol. 190 (1989), pp. 1931-1940.
G. J. Ray et al. "Carbon-13 Nuclear Magnetic Resonance Determination of Monomer Composition and Sequence Distributions in Ethylene-Propylene Copolymers Prepared with a Stereoregular Catalyst System", Macromolecules, vol. 10, No. 4, 1977, p. 773-778.
Plastics Additives Handbook, ed. H. Zweifel, 5th edition, 2001, Hanser Publishers.

* cited by examiner

*Primary Examiner* — Nathan M Nutter
(74) *Attorney, Agent, or Firm* — Albert Shung

(57) ABSTRACT

The present invention relates to a polypropylene composition comprising: a first polypropylene homopolymer or random copolymer (PPR1) having a comonomer content lower than the comonomer content of the second polypropylene, a second polypropylene (PPR2) which is a random copolymer of propylene and of the comonomer; said comonomer being an alpha-olefin different from propylene, the melting temperature of the polypropylene composition ($T_m$(PPR)) being defined as $T_m$(PPR)>165−6.9*[total comonomer content]−8.4*[comonomer content of the first polypropylene], the difference between the melting temperature and the crystallization temperature of the polypropylene composition ranges from 27 and 33, and a xylene soluble fraction (XS) at 23° C. of not more than 1.5 wt. %. The present invention also relates to a process for the preparation of said polypropylene composition. The present invention further relates to the use of said polypropylene composition for producing films or moulded articles.

12 Claims, No Drawings

BIMODAL POLYPROPYLENE AND PROCESS FOR THE PREPARATION THEREOF

CROSS-REFERENCE TO RELATED APPLICATIONS

This application claims the benefit of PCT/EP2016/051353 filed Jan. 22, 2016, which claims priority from EP 15152333.9 filed Jan. 23, 2016, which are incorporated herein by reference in their entireties for all purposes.

FIELD OF THE INVENTION

The invention relates to bimodal polypropylene and in particular to bimodal polypropylene random copolymer and process for producing thereof. The present invention also relates to an article comprising said bimodal polypropylene random copolymer.

BACKGROUND OF THE INVENTION

Polypropylene offers a unique combination of mechanical and chemical properties. It has therefore found wide use in a large number of applications. It is generally of great importance to have a well processable material with good mechanical properties such as high flexural modulus and/or impact strength. A good flowability combined with adequate thermal properties are needed for achieving a good processability in various manufacturing methods of articles, thereby allowing a high production speed required for the mass production market.

The mechanical properties are also critical to avoid damage due to storing, handling or dropping of the articles made of polypropylene. Still further, the optical properties should be acceptable. Optical properties are mainly defined by the haze and the gloss of the material. The haze is influenced by the nature and the crystallinity of the polypropylene, lowering the intrinsic crystallinity reduces the haze but also reduces the stiffness. Hence, the balance of stiffness and haze is of great importance.

WO2012/072776 discloses the preparation of caps and closures made of monomodal polypropylene random copolymer (noted PPR) and having improved flexural modulus. The improvement of the flexural modulus is observed when using metallocene catalysts instead of Ziegler-Natta catalysts and simultaneously by lowering the content of the comonomer and increasing the melt flow index of the resulting polypropylene random copolymer. The haze values of the PPR copolymer are also slightly reduced when metallocene catalysts are used in the above-mentioned conditions.

While the manufacturers of polypropylene have continuously worked to improve the properties of polypropylene used in the manufacture of various articles, the ever increasing requirements necessitate the further development of polypropylene.

SUMMARY OF THE INVENTION

Hence, it is an object of the present invention to provide polypropylene, in particular polypropylene random copolymer, with good mechanicals properties or good optical properties and good processability.

It is a further object of the present invention to provide polypropylene, in particular polypropylene random copolymer, with good organoleptics or low volatiles or both.

The invention is defined by the independent claims. The dependent claims define advantageous embodiments.

According to the invention, there is provided a polypropylene composition comprising:
(A) a first polypropylene homopolymer or random copolymer (PPR1) having a comonomer content lower than the comonomer content of the second polypropylene,
(B) a second polypropylene (PPR2) which is a random copolymer of propylene and of the comonomer;
wherein:
said polypropylene composition has a total comonomer content ranging from 0.25 and to 4.5 wt % based on the total weight of said polypropylene composition,
said comonomer is an alpha-olefin different from propylene,
the melting temperature, measured by DSC based on ISO 3146, of the polypropylene composition ($T_m$(PPR)) is defined as $T_m$(PPR)>165−6.9×[total comonomer content]−8.4×[comonomer content of the first polypropylene PPR1], the difference between the melting temperature and the crystallisation temperature, both measured by DSC, of the polypropylene composition ranges from 27 to 33, and
a xylene soluble fraction (XS) of not more than 1.5 wt. % measured as follows:
between 4.5 and 5.5 q of propylene polymer are weighed into a flask and 300 ml xylene are added. The xylene is heated under stirring to reflux for 45 minutes. Stirring is continued for 15 minutes without heating. The flask is then placed in a thermostat bath set to 25° C.+/−1° C. for 1 hour. The solution is filtered through Whatman n° 4 filter paper and 100 ml of solvent are collected. The solvent is then evaporated and the residue dried and weighed. The percentage of xylene solubles ("XS"), i.e. the amount of the xylene soluble fraction, is then calculated according to:

XS (in wt %)=(Weight of the residue/initial total weight of PP)*100 with all weights being in the same unit, such as for example in grams.

The polypropylene composition is thus bimodal with respect to the comonomer distribution since each fraction (A) and (B) as defined above has different comonomer content. Such polypropylene composition shows better mechanical properties compared to a polypropylene random copolymer being monomodal with respect to the ethylene distribution. It has been further observed that the crystallization and melting temperatures of the polypropylene compositions according to the present invention are also increased.

The comonomer is an alpha-olefin different from propylene. Preferably, the comonomer is selected from the group consisting of ethylene, butene-1, pentene-1, hexene-1 and 4-methyl-1-pentene. More preferably, the comonomer is selected from the group consisting of ethylene, butene-1 and hexene-1. Even more preferably, the comonomer is ethylene. If any, the comonomer of the first polypropylene is the same as the comonomer of the second polypropylene.

Preferably, the present invention provides a polypropylene composition comprising:
(A) a first polypropylene homopolymer or random copolymer (PPR1) having an ethylene content lower than the ethylene content of the second polypropylene, (B) a second polypropylene (PPR2) which is a random copolymer of propylene and ethylene;
wherein:
said polypropylene composition has a total ethylene content ranging from 0.25 to 4.5 wt % based on the total weight of said polypropylene composition,
the melting temperature, measured by DSC based on ISO 3146, of the polypropylene composition ($T_m$(PPR)) is defined as $T_m$(PPR)>165−6.9×[total ethylene content]−8.4× [ethylene content of the first polypropylene PPR1], the difference between the melting temperature and the crystallisation temperature, both measured by DSC, of the polypropylene composition ranges from 27 and 33, and
a xylene soluble fraction (XS) of not more than 1.5 wt. % measured as follows:
between 4.5 and 5.5 g of propylene polymer are weighed into a flask and 300 ml xylene are added. The xylene is heated under stirring to reflux for 45 minutes. Stirring is continued for 15 minutes without heating. The flask is then placed in a thermostat bath set to 25° C.+/−1° C. for 1 hour. The solution is filtered through Whatman n° 4 filter paper and 100 ml of solvent are collected. The solvent is then evaporated and the residue dried and weighed. The percentage of xylene solubles ("XS"), i.e. the amount of the xylene soluble fraction, is then calculated according to:

XS (in wt %)=(Weight of the residue/initial total weight of PP)*100 with all weights being in the same unit, such as for example in grams.

Hence, in a preferred embodiment, the polypropylene composition according to the present invention is a polypropylene random copolymer having bimodal ethylene distribution.

In another aspect of the present invention, a process for the preparation of the present polypropylene composition is provided. Said process comprises the steps of:
(i) providing of a first polypropylene having a comonomer content from 0 to lower than the comonomer content of the second polypropylene,
(ii) providing of a second polypropylene which is a random copolymer of propylene and said comonomer,
(iii) recovering the polypropylene composition having a total comonomer content ranging from 0.25 and 4.5 wt % based on the total weight of said polypropylene composition,
wherein steps (i) and (ii) are carried out by polymerizing propylene and optionally said comonomer in presence of a metallocene-based polymerization catalyst, preferably with the same metallocene-based polymerization catalyst.

In a further aspect of the present invention, the present polypropylene composition may be used for the production of films or moulded articles. An article comprising a polypropylene composition according to the present invention is also provided.

DETAILED DESCRIPTION OF THE PRESENT INVENTION

The present invention has been described in terms of specific embodiments, which are illustrative of the invention and not to be construed as limiting. More generally, it will be appreciated by persons skilled in the art that the present invention is not limited by what has been particularly shown and/or described hereinabove. Use of the verbs "to comprise", "to include", "to be composed of", or any other variant, as well as their respective conjugations, does not exclude the presence of elements other than those stated. Use of the article "a", "an" or "the" preceding an element does not exclude the presence of a plurality of such elements. Throughout the present application, the term "polypropylene random copolymer" may be used to denote a "random copolymer of propylene and a comonomer" as described above.

The present invention relates to a polypropylene composition comprising:
(A) a first polypropylene homopolymer or random copolymer (PPR1) having a comonomer content lower than the comonomer content of the second polypropylene,
(B) a second polypropylene (PPR2) which is a random copolymer of propylene and of the comonomer.

The present invention therefore provides a polypropylene composition having bimodal comonomer distribution, i.e. a first fraction, 'A', having a defined comonomer content and a second fraction, 'B', having a defined comonomer content different and greater than the comonomer content of the fraction 'A'. As mentioned above, due to the split in comonomer distribution between both fractions 'A' and 'B' of the present polypropylene composition, the mechanical properties of said polypropylene composition are improved compared to a polypropylene composition wherein both fractions have the same comonomer content, i.e. monomodal comonomer distribution. Thermal properties as well as optical properties of the present polypropylene composition are also excellent compared to a polypropylene having monomodal comonomer distribution, if the comparison is made at the same total comonomer content. It is pointed out herein that when the first polypropylene is a homopolymer of propylene, the comonomer content is 0.

In a preferred embodiment, the polypropylene composition has a total comonomer content ranging from 0.25 and 4.5 wt % based on the total weight of said polypropylene composition.

Preferably, the melting temperature of the polypropylene composition ($T_m$(PPR)) is defined as $T_m$(PPR)>165−6.9×[total comonomer content]−8.4× [comonomer content of the first polypropylene].

The total comonomer content refers to the total comonomer content in the polypropylene composition.

Preferably, the difference between the melting temperature and the crystallisation temperature of the polypropylene composition ranges from 27 and 33.

Furthermore, the polypropylene composition according to the present invention has a xylene soluble fraction (XS) of not more than 1.5 wt. % measured according to the method disclosed on page 19, lines 3 to 14.

Said comonomer is an alpha-olefin different from propylene. Preferably, the comonomer is selected from the group consisting of ethylene, butene-1, pentene-1, hexene-1 and 4-methyl-1-pentene. More preferably, the comonomer is selected from the group consisting of ethylene, butene-1 and hexene-1. Even more preferably, the comonomer is ethylene.

Preferably, the present invention provides a polypropylene composition comprising:
(A) a first polypropylene homopolymer or random copolymer (PPR1) having an ethylene content lower than the ethylene content of the second polypropylene, (B) a second polypropylene (PPR2) which is a random copolymer, having a second ethylene content;

wherein:

said polypropylene composition has a total ethylene content ranging from 0.25 to 4.5 wt % based on the total weight of said polypropylene composition, the melting temperature of the polypropylene composition ($T_m$(PPR)) is defined as $T_m$(PPR)>165−6.9×[total ethylene content]−8.4× [ethylene content of the first polypropylene], the difference between the melting temperature and the crystallisation temperature of the polypropylene composition ranges from 27 to 33, and a xylene soluble fraction (XS) of not more than 1.5 wt. % measured as follows:

between 4.5 and 5.5 q of propylene polymer are weighed into a flask and 300 ml xylene are added. The xylene is heated under stirring to reflux for 45 minutes. Stirring is continued for 15 minutes without heating. The flask is then placed in a thermostat bath set to 25° C.+/−1° C. for 1 hour. The solution is filtered through Whatman n° 4 filter paper and 100 ml of solvent are collected. The solvent is then evaporated and the residue dried and weighed. The percentage of xylene solubles ("XS"), i.e. the amount of the xylene soluble fraction, is then calculated according to:

XS (in wt %)=(Weight of the residue/initial total weight of PP)*100 with all weights being in the same unit, such as for example in grams.

Said polypropylene composition has a regiodefect content ranging from 0.1% to 5 based on the total weight of said polypropylene composition. Preferably, said polypropylene composition has a regiodefects content ranging from 0.1% to 4.5%, more preferably from 0.1% to 4.0%, even more preferably from 0.1% to 3.5%, most preferably from 0.1% to 3.0%, even most preferably from 0.1% to 2.5% and in particular from 0.1% and 2.0%. The term regiodefects content refers to the percentage of 2,1-insertions relative to the total number of propylene molecules in the polymer chain. The method for determining the percentage of 2,1-insertions is given in the test methods.

As mentioned above, the polypropylene composition has a total comonomer content ranging from 0.25 and 4.5 wt % based on the total weight of said polypropylene composition. Preferably, the total comonomer content is at least 0.25 wt %, more preferably at least 1.0 wt %, even more preferably at least 1.5 wt %. Preferably, the comonomer content is at most 4.5 wt %, more preferably at most 3.5 wt %, even more preferably 3.0 wt %, most preferably 2.5 wt %. The comonomer content can be determined by $^{13}$C NMR spectroscopy as described in details in the examples.

The first polypropylene can be polypropylene homopolymer or polypropylene random copolymer. The first polypropylene has a comonomer content of from 0 to lower than the comonomer content of the second polypropylene. The comonomer content of the second polypropylene can be determined such that it is equal to (the comonomer content of the first polypropylene+at least 0.5 and preferably at most 8.0). Preferably, the comonomer content of the second polypropylene=comonomer content of the first polypropylene+at least 0.75, preferably at least 1.4, more preferably at least 2.0, even more preferably at least 2.5, most preferably at least 3.0, and at most 8.0.

Hence, said second polypropylene has a comonomer content greater than 1.5 wt % based on the total weight of the second polypropylene. Preferably, said comonomer content of the second polypropylene, which is greater than the comonomer content of the first polypropylene, is at least 1.5 wt %, more preferably at least 2.0 wt %, most preferably at least 2.5 wt %, and at most 8.0 wt %, preferably at most 7.0 wt %, more preferably at most 6.0 wt %, and most preferably at most 5.5 wt % based on the total weight of the second polypropylene. In particular, when the comonomer is ethylene, the ethylene content of the second polypropylene may be greater than 1.5 wt % based on the total weight of the second polypropylene. Preferably, said ethylene content of the second polypropylene is at least 1.5 wt %, more preferably at least 2.0 wt %, most preferably at least 2.5 wt %, and at most 8.0 wt %, preferably at most 7.0 wt %, more preferably at most 6.0 wt %, and most preferably at most 5.5 wt % based on the total weight of the second polypropylene.

In particular, the comonomer content of the first polypropylene may range from 0 to 3.5% based on the total weight of the first polypropylene, preferably from 0.5 to 3%, more preferably from 0.5 to 2.0% based on the total weight of the first polypropylene; and in particular, the comonomer content of the second polypropylene may range from 1 to 5% based on the total weight of the second polypropylene, preferably from 1.5 to 4.5%, more preferably from 2.0 to 4.0% based on the total weight of the second polypropylene. The above-mentioned ranges are particularly suitable when the comonomer is ethylene.

Preferably, within said polypropylene composition according to the present invention said first polypropylene represents from 25 to 75 wt % based on the weight of said first and second polypropylene. Within said polypropylene composition according to the present invention said second polypropylene random copolymer represents from 25 to 75 wt % based on the weight of said first and second polypropylene.

Said polypropylene composition comprises at least 70 wt % of said first and second polypropylene based on the total weight of said polypropylene composition, preferably at least 80 wt %, more preferably at least 85 wt % or 90 wt %, even more preferably at least 95 wt % or 97 wt %, most preferably at least 99 wt % based on the total weight of said polypropylene composition.

Preferably, said polypropylene composition according to the present invention may have a molecular weight distribution, defined as Mw/Mn, i.e. the ratio of weight average molecular weight Mw and number average molecular weight Mn, of at most 4.0, more preferably of at most 3.5, even more preferably of at most 3.0, and most preferably of at most 2.8. Preferably said molecular weight distribution is at least 2.0, more preferably at least 2.5. Molecular weights can be determined by size exclusion chromatography (SEC), frequently also referred to as gel permeation chromatography (GPC), as described in detail in the examples.

Preferably, said polypropylene composition according to the present invention may have a melting temperature ranging from 130° C. and 170° C., said melting temperature being measured by DSC at a heating rate of 20° C./min.

Preferably, the polypropylene composition have at least two peaks representative of its melting temperature when said melting temperature is measured by DSC at a heating rate of 10° C./min, said at least two peaks being comprised between 110° C. and 170° C. Lowering the traditional heating rate of 20° C./min of the DSC measurement allow to separate the contribution of said first polypropylene and the second polypropylene which have different melting temperatures due to their respective comonomer content. Hence, at low heating rate, e.g. 10° C./min, the melting temperature of said polypropylene composition may include the melting temperature of said first polypropylene and of said second polypropylene.

Preferably, said polypropylene composition may have a melt flow index ranging from 1 to 200 g/10 min, preferably from 1 to 100 g/10 min, more preferably ranging from 10 to 50 g/10 min, more preferably ranging from 20 to 40 g/10 min; the values of melt flow index being measured according to ISO 1133 (230° C., 2.16 kg load).

Preferably, the melt flow index of the first polypropylene may range from 1 to 1000 g/10 min, preferably, from 1 to 800 g/10 min, more preferably from 1 to 500 g/10 min, even more preferably from 1 to 200 g/10 min, most preferably ranging from 1 to 100 g/10 min; the values of melt flow index being measured according to ISO 1133 (230° C., 2.16 kg load).

Preferably, the melt flow index of the second polypropylene may range from 1 to 500 g/10 min, preferably from 1 to 200 g/10 min, more preferably from 1 to 100 g/10 min, most preferably ranging from 8 to 45 g/10 min; the values of melt flow index being measured according to ISO 1133 (230° C., 2.16 kg load). Alternatively, when the second polypropylene is prepared without being isolated, the melt flow index thereof can be determined by the following equation (I):

$$Log(MFIR_2)=(log(MFI)-\% R_1 log(MFIR_1))/(1-\% R_1) \qquad (I)$$

wherein $MFIR_2$ refers to the melt flow index of the second polypropylene, MFI refers to the melt flow index of the polypropylene composition, MFIR1 refers to the melt flow index of the first polypropylene and % R1 refers to the percentage of the first polypropylene in the polypropylene composition.

Preferably, said polypropylene composition according to the present invention has xylene soluble fraction lower than 5 wt % based on the total weight of said polypropylene composition, preferably lower than 3 wt %, more preferably lower than 2 wt %.

Preferably, said polypropylene composition according to the present invention may have notched izod impact strength lower than 10 kJ/m$^2$, more preferably lower than 5 kJ/m$^2$, most preferably between 3.0 and 4.0 kJ/m$^2$.

Preferably, said polypropylene composition according to the present invention may have haze values lower than 20%, more preferably lower than 15%, most preferably between 5 and 15% for a plate of 1 mm thickness. The haze values are obtained based on polypropylene composition containing a clarifying agent.

Preferably, said polypropylene composition according to the present invention may have an elongation at break greater than 500%, measured according to ISO 527.

Preferably, said polypropylene composition according to the present invention may have a constraint at yield greater than 30.3 MPa, measured according to ISO 527.

Preferably, said polypropylene composition according to the present invention may have a flexural modulus of at least 1000 MPa, preferably at least 1100 MPa, the flexural modulus being measured at 23° C. according to ISO 178.

The polypropylene composition according to the present invention may be obtained by polymerizing propylene and at least one comonomer, preferably ethylene, with a metallocene-based polymerization catalyst. Preferably, the preparation of the present polypropylene composition may comprise the polymerization of said first and second polypropylene random copolymers in two separated reaction zones, preferably with the same metallocene-based polymerization catalyst.

Preferably the metallocene-based polymerization catalyst comprises a bridged metallocene component, an activating agent having an alkylating and/or ionizing action and optionally a support. Such metallocene-based polymerization catalysts are generally known in the art. The metallocene-based polymerization catalysts used herein provide to the present polypropylene composition a regiodefects content as described above.

The metallocene component used to prepare the metallocene polypropylene can be any bridged metallocene known in the art. Preferably it is a metallocene represented by the following general formula.

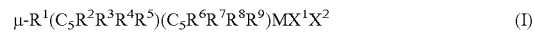

$$\mu\text{-}R^1(C_5R^2R^3R^4R^5)(C_5R^6R^7R^8R^9)MX^1X^2 \qquad (I)$$

wherein
the bridge $R^1$ is $-(CR^{10}R^{11})_p-$ or $-(SiR^{10}R^{11})_p-$ with p=1 or 2, preferably it is $-(SiR^{10}R^{11})-$;
M is a metal selected from Ti, Zr and Hf, preferably it is Zr;
$X^1$ and $X^2$ are independently selected from the group consisting of halogen, hydrogen, $C_1$-$C_{10}$ alkyl, $C_6$-$C_{15}$ aryl, alkylaryl with $C_1$-$C_{10}$ alkyl and $C_6$-$C_{15}$ aryl;
$R^2$, $R^3$, $R^4$, $R^5$, $R^6$, $R^7$, $R^8$, $R^9$, $R^{10}$ and $R^{11}$ are each independently selected from the group consisting of hydrogen, $C_1$-$C_{10}$ alkyl, $C_5$-$C_7$ cycloalkyl, $C_6$-$C_{15}$ aryl, alkylaryl with $C_{10}$-$C_{10}$ alkyl and $C_6$-$C_{15}$ aryl, or any two neighboring R may form a cyclic saturated or non-saturated $C_4$-$C_{10}$ ring; each $R^2$, $R^3$, $R^4$, $R^5$, $R^6$, $R^7$, $R^8$, $R^9$, $R^{10}$ and $R^{11}$ may in turn be substituted in the same way.

The preferred metallocene components are represented by the general formula (I), wherein
the bridge $R^1$ is $SiR^{10}R^{11}$;
M is Zr;
$X^1$ and $X^2$ are independently selected from the group consisting of halogen, hydrogen, and $C_1$-$C_{10}$ alkyl; and $(C_5R^2R^3R^4R^5)$ and $(C_5R^6R^7R^8R^9)$ are indenyl of the general formula $C_9R^{12}R^{13}R^{14}R^{15}R^{16}R^{17}R^{18}R^{19}$, wherein $R^{12}$, $R^{13}$, $R^{14}$, $R^{15}$, $R^{16}$, $R^{17}$, and $R^{18}$ are each independently selected from the group consisting of hydrogen, $C_1$-$C_{10}$ alkyl, $C_5$-$C_7$ cycloalkyl, $C_6$-$C_{15}$ aryl, and alkylaryl with $C_1$-$C_{10}$ alkyl and $C_6$-$C_{15}$ aryl, or any two neighboring R may form a cyclic saturated or non-saturated $C_4$-$C_{10}$ ring;
$R^{10}$ and $R^{11}$ are each independently selected from the group consisting of $C_1$-$C_{10}$ alkyl, $C_5$-$C_7$ cycloalkyl, and $C_6$-$C_{15}$ aryl, or $R^{10}$ and $R^{11}$ may form a cyclic saturated or non-saturated $C_4$-$C_{10}$ ring; and
each $R^{10}$, $R^{11}$, $R^{12}$, $R^{13}$ $R^{14}$ $R^{15}$ $R^{16}$ $R^{17}$ and $R^{18}$ may in turn be substituted in the same way.

The polypropylenes produced with the preferred metallocene compounds have surprisingly been identified as having a very low content of volatile organic compounds (VOC) even at very low viscosity.

Particularly suitable metallocenes are those having $C_2$-symmetry.

Examples of particularly suitable metallocenes are:
dimethylsilanediyl-bis(cyclopentadienyl)zirconium dichloride,
dimethylsilanediyl-bis(2-methyl-cyclopentadienyl)zirconium dichloride,
dimethylsilanediyl-bis(3-methyl-cyclopentadienyl)zirconium dichloride,
dimethylsilanediyl-bis(3-tert-butyl-cyclopentadienyl)zirconium dichloride,
dimethylsilanediyl-bis(3-tert-butyl-5-methyl-cyclopentadienyl)zirconium dichloride, dimethylsilanediyl-bis(2,4-dimethyl-cyclopentadienyl)zirconium dichloride,
dimethylsilanediyl-bis(indenyl)zirconium dichloride,
dimethylsilanediyl-bis(2-methyl-indenyl)zirconium dichloride,
dimethylsilanediyl-bis(3-methyl-indenyl)zirconium dichloride,
dimethylsilanediyl-bis(3-tert-butyl-indenyl)zirconium dichloride,
dimethylsilanediyl-bis(4,7-dimethyl-indenyl)zirconium dichloride,
dimethylsilanediyl-bis(tetrahydroindenyl)zirconium dichloride,
dimethylsilanediyl-bis(benzindenyl)zirconium dichloride,
dimethylsilanediyl-bis(3,3'-2-methyl-benzindenyl)zirconium dichloride,
dimethylsilanediyl-bis(4-phenyl-indenyl)zirconium dichloride,
ethylene-bis(indenyl)zirconium dichloride,
ethylene-bis(tetrahydroindenyl)zirconium dichloride,
isopropylidene-(3-tert-butyl-5-methyl-cyclopentadienyl) (fluorenyl) zirconium dichloride.

The metallocene may be supported according to any method known in the art. In the event it is supported, the support used in the present invention can be any organic or inorganic solid, particularly porous supports such as talc, inorganic oxides, clays and clay minerals, ion-exchanged layered compounds, diatomaceous earth compounds, zeolites or a resinous support material, such as a polyolefin, for example. Preferably, the support material is an inorganic oxide in its finely divided form. Specific inorganic oxides include silica, alumina, magnesia, titania and zirconia, for example. Preferably, the inorganic support may comprise silica and/or alumina. The inorganic support may comprise from 10 to 100 wt % of silica and/or preferably from 10 to 100 wt % of alumina.

In a preferred embodiment, the metallocene-based polymerization catalyst may comprise an activating agent selected from alkyl aluminium, alumoxanes and boron-containing compounds. The activating agent can be an alkyl aluminium represented by formula $AlR^*_n X_{3-n}$ wherein $R^*$ is an alkyl having from 1 to 20 carbon atoms, n is an integer between 0 and 3 and X is a halogen. The preferred alkyl aluminium may be triisobutylaluminum (TIBAL) or triethylaluminium (TEAL). The alkyl aluminium can be used in combination with a perfluoroborate e.g. $[Ph_3C][B(C_6F_5)_4]$ or $[Me_2NPhH][B(C_6F_5)_4]$. For example, using a combination of $[Ph_3C][B(C_6F_5)_4]$/TIBAL or of $[Me_2NPhH][B(C_6F_5)_4]$/TIBAL.

Suitable boron-containing agents may also be used for activating the bridged-metallocene component to form a metallocene-based polymerization catalyst. These include for example a triphenylcarbenium boronate such as tetrakis (pentafluorophenyl)borato-triphenylcarbenium as described in EP-A-0427696, or those of the general formula $[L'-H]^+ [BAr^1Ar^2X^3X^4]^-$ as described in EP-A-0277004 (page 6, line 30 to page 7, line 7). The amount of boron-containing activating agent is selected to give a B/M ratio of from 0.5 to 5, preferably of about 1.

The activating agent may be an aluminoxane and may comprise oligomeric linear and/or cyclic alkyl aluminoxanes represented by formula

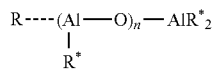

for oligomeric, linear aluminoxanes and by formula

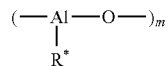

for oligomeric, cyclic aluminoxane, wherein n is 1-40, preferably 1-20, m is 3-40, preferably 3-20 and $R^*$ is a $C_1$-$C_8$ alkyl group and preferably methyl or isobutyl. Preferably, the activating agent is selected from methylaluminoxane (MAO) and ethylaluminoxane. More preferably the activating agent is MAO. The amount of activating agent is selected to give an Al/M ratio of 10 to 10,000, preferably 100 to 10,000, more preferably of 200 to 4,000, even more preferably from 500 to 3,000, most preferably from to 1,000 to 3,000. The amount of activating agent depends upon its nature.

The metallocene-based polymerization catalyst may comprise a scavenger that may be selected from the group consisting of alkyl aluminium represented by formula $AlR^*_n X_{3-n}$ wherein $R^*$ is an alkyl having from 1 to 20 carbon atoms, n is an integer between 0 and 3 and X is a halogen; or aluminoxane. Said scavenger may be, for example, triethylaluminium, triisobutylaluminum, tris-n-octylaluminum, tetraisobutyldialuminoxane, diethylzinc, tris-n-hexyl aluminium, diethylchloroaluminum or MAO. Usually, the scavenger is added after activation of the metallocene component with the activating agent. Preferably, the scavenger is different from the activating agent.

Preferably, the polypropylene composition comprises at least one additive selected from the group consisting of nucleating agents, antistatic agents, processing aids and blends of any of these, such as a blend of nucleating agent(s) and antistatic agent(s) or a blend of nucleating agent(s) and processing aid(s) or a blend of antistatic agent(s) and processing aid(s) or a blend of all three. Examples of nucleating agents, antistatic agents and processing aids are described in WO2012/072776 (page 11, line 4—page 16, line 16).

In an embodiment, the polypropylene of the invention may also comprise further additives, such as by way of example, antioxidants, light stabilizers, acid scavengers, lubricants and colorants. An overview of such additives may be found in Plastics Additives Handbook, ed. H. Zweifel, 5$^{th}$ edition, 2001, Hanser Publishers.

According to a second aspect of the present invention, a process for preparing a polypropylene composition is provided. Said process comprises the steps of:
(i) providing of a first polypropylene having a comonomer content from 0 to lower than the comonomer content of the second polypropylene,
(ii) providing of a second polypropylene which is a random copolymer of propylene and said comonomer,
(iii) recovering the polypropylene composition having a total comonomer content ranging from 0.25 and 4.5 wt % based on the total weight of said polypropylene composition.

Each of said first and second polypropylene has at least 0.1% of regiodefect content. Each of said first and second polypropylene is prepared in presence of a metallocene catalyst. Preferably, the polypropylene composition obtained in step (iii) has a regiodefects content ranging from 0.1% to 5% based on the total weight of said polypropylene composition. Preferably, said polypropylene composition may have a regiodefects content ranging from 0.1% to 4.5%, more preferably from 0.1% to 4.0%, even more preferably from 0.1% to 3.5%, most preferably from 0.1% to 3.0%, even most preferably from 0.1% to 2.5% and in particular from 0.1% and 2.0%.

The first polypropylene and second polypropylene provided in steps (i) and (ii) of the present process are prepared by polymerizing propylene and if any the comonomer in presence of a metallocene-based polymerization catalyst as described above.

The polymerization of propylene and of said comonomer in presence of a metallocene-based polymerization catalyst can be carried out according to known techniques in one or more polymerization reactors. The amount of comonomer injected in said one or more polymerization reactors may be determined such as to obtain the required comonomer content in said first polypropylene and in said second polypropylene.

Addition of hydrogen in the polymerization medium may be controlled to prepare said polypropylene composition. The amount of hydrogen added is determined to obtain the required melt flow index values.

The polymerisation process can be carried out in solution, slurry or gas phase. The slurry process can be carried out in a reactor suitable for such processes, such as continuously stirred tank reactors (CSTRs) or slurry loop reactors (in particular liquid full loop reactors). The pressure in the reactor can vary from 0.5 to 50 bars, preferably from 5 to 40 bars.

Preferably, two or more reactors, or two or more reaction zones of the same reactor, may be connected in series or in parallel, more preferably in series, in order to produce a polypropylene composition according to the present invention having bimodal comonomer distribution. Preferably, the metallocene-based polymerization catalyst used in each reactor may be the same.

As mentioned above, said comonomer used in the present process is an alpha-olefin different from propylene. Preferably, the comonomer is selected from the group consisting of ethylene, butene-1, pentene-1, hexene-1 and 4-methyl-1-pentene. More preferably, the comonomer is selected from the group consisting of ethylene, butene-1 and hexene-1. Even more preferably, the comonomer is ethylene.

In a third aspect of the present invention, an article comprising a polypropylene composition according to the present invention is provided.

In a fourth aspect of the present invention, the polypropylene composition according to the present invention is suitable for the production of films or moulded articles.

Test Methods

The melt flow index (MFI) of first and second polypropylene random copolymers and polypropylene compositions is determined according to ISO1133, condition L, at 230° C. and 2.16 kg.

Molecular weights are determined by Size Exclusion Chromatography (SEC) at high temperature (145° C.). A 10 mg polypropylene sample is dissolved at 160° C. in 10 ml of trichlorobenzene (technical grade) for 1 hour. Analytical conditions for the GPCV 2000 from WATERS are:

Injection volume: +/−400 μl
Automatic sample preparation and injector temperature: 160° C.
Column temperature: 145° C.
Detector temperature: 160° C.
Column set: 2 Shodex AT-806MS and 1 Styragel HT6E
Flow rate: 1 ml/min
Detector: Infrared detector (2800-3000 cm$^{-1}$)
Calibration: Narrow standards of polystyrene (commercially available)

Calculation for polypropylene: Based on Mark-Houwink relation ($\log_{10}(MPP)=\log_{10}(Mps)-0.25323$); cut off on the low molecular weight end at Mpp=1000.

The molecular weight distribution (MWD) is then calculated as Mw/Mn.

The $^{13}$C-NMR analysis is performed using a 400 MHz Bruker NMR spectrometer under conditions such that the signal intensity in the spectrum is directly proportional to the total number of contributing carbon atoms in the sample. Such conditions are well known to the skilled person and include for example sufficient relaxation time etc. In practice the intensity of a signal is obtained from its integral, i.e. the corresponding area. The data is acquired using proton decoupling, 4000 scans per spectrum, a pulse repetition delay of 20 seconds and a spectral width of 26000 Hz. The sample is prepared by dissolving a sufficient amount of polymer in 1,2,4-trichlorobenzene (TCB, 99%, spectroscopic grade) at 130° C. and occasional agitation to homogenize the sample, followed by the addition of hexadeuterobenzene ($C_6D_6$, spectroscopic grade) and a minor amount of hexamethyldisiloxane (HMDS, 99.5+%), with HMDS serving as internal standard. To give an example, about 200 mg of polymer are dissolved in 2.0 ml of TCB, followed by addition of 0.5 ml of $C_6D_6$ and 2 to 3 drops of HMDS.

Following data acquisition the chemical shifts are referenced to the signal of the internal standard HMDS, which is assigned a value of 2.03 ppm.

The isotacticity is determined by $^{13}$C-NMR analysis on the total polymer. In the spectral region of the methyl groups the signals corresponding to the pentads mmmm, mmmr, mmrr and mrrm are assigned using published data, for example A. Razavi, Macromol. Symp., vol. 89, pages 345-367. Only the pentads mmmm, mmmr, mmrr and mrrm are taken into consideration due to the weak intensity of the signals corresponding to the remaining pentads. For the signal relating to the mmrr pentad a correction is performed for its overlap with a methyl signal related to 2,1-insertions. The percentage of mmmm pentads is then calculated according to % mmmm=AREAmmmm/(AREAmmmm+ AREAmmmr+AREAmmrr+AREAmrrm)*100

The regiodefects content in the polypropylene composition is the percentage of 2,1-insertions in the polypropylene composition. The determination of the percentage of 2,1-insertions is detailed herein with respect to ethylene as comonomer but can be applied with other comonomers.

The determination of the percentage of 2,1-insertions for a metallocene random copolymer of propylene and ethylene is determined by two contributions:

(i) the percentage of 2,1-insertions as defined above for the propylene homopolymer, and
(ii) the percentage of 2,1-insertions, wherein the 2,1-inserted propylene neighbors an ethylene, thus the total percentage of 2,1-insertions corresponds to the sum of these two contributions. For a metallocene propylene homopolymer, the signals corresponding to the 2,1-insertions are identified with the aid of published data, for example H. N. Cheng, J. Ewen, Makromol. Chem., vol. 190 (1989), pages 1931-1940. A first area, AREA1, is defined as the average area of the signals corresponding to 2,1-insertions. A second area, AREA2, is defined as the average area of the signals corresponding to 1,2-insertions. The assignment of the signals relating to the 1,2-insertions is well known to the skilled person and need not be explained further. The percentage of 2,1-insertions is calculated according to 2,1-insertions(in %)=AREA1/(AREA1+AREA2)*100 with the percentage in 2,1-insertions being given as the molar percentage of 2,1-inserted propylene with respect to total propylene.

The assignments of the signal for case (ii) can be done either by using reference spectra or by referring to the published literature.

The total ethylene content (wt % C2) relative to the total weight of the propylene polymer is determined by NMR analysis of pellets according to the method described by G. J. Ray et al. in Macromolecules, vol. 10, no 4, 1977, p. 773-778 or alternatively.

Melting and crystallization temperatures, Tm and Tc respectively, are measured on a DSC Q2000 instrument by TA Instruments based on ISO 3146. To erase the thermal history the samples are first heated to 200° C. and kept at 200° C. for a period of 3 minutes. The melting temperatures Tm are then determined with heating rates of 20° C./min or 10° C./min and cooling rates of 20° C./min. The crystallization temperatures Tc are then determined with heating and cooling rates of 20° C./min.

Flexural modulus was determined according to ISO 178: 2001.

Notched izod impact strength was determined according to ISO 180/A:2000 at 23° C.

Haze was measured according to ISO 14782:1999 on injection moulded plaques having a thickness of 1 mm.

Constraint at yield was determined according to ISO 527.

Elongation at break was determined according to ISO 527

Xylene solubles (XS), i.e. the xylene soluble fraction, is determined as follows: between 4.5 and 5.5 g of propylene polymer are weighed into a flask and 300 ml xylene are added. The xylene is heated under stirring to reflux for 45 minutes. Stirring is continued for 15 minutes without heating. The flask is then placed in a thermostat bath set to 25° C.+/−1° C. for 1 hour. The solution is filtered through Whatman n° 4 filter paper and 100 ml of solvent are collected. The solvent is then evaporated and the residue dried and weighed. The percentage of xylene solubles ("XS"), i.e. the amount of the xylene soluble fraction, is then calculated according to:

XS(in wt %)=(Weight of the residue/initial total weight of PP)*100 with all weights being in the same unit, such as for example in grams.

EXAMPLES

The present invention is exemplified with, but not limited to, ethylene as comonomer.

Polypropylene compositions of Example 1 to 3 were according to the present invention and produced by standard polymerization method in a reactor comprising two interconnected reaction zones using a metallocene catalyst with a dimethylsilyl-bridged bis(indenyl)zirconium dichloride as metallocene component. For each example, the comonomer content in each polypropylene random copolymer varies and is determined such as to increase the absolute difference between the comonomer content of the first polypropylene random copolymer and the comonomer content of the second polypropylene random copolymer, i.e. resulting in an increase of the split in ethylene distribution in the polypropylene composition so produced. The hydrogen content in each reactor is introduced to obtain the desired melt flow index. The polypropylene compositions of examples 1 to 3 have a regiodefects content ranging from 0.5 to 1.5% based on the total weight of the polypropylene composition.

The comparative example 4 is prepared in the same polymerization conditions apart from the comonomer content which is adapted to produce first and second polypropylene random copolymers having the same comonomer content.

Results and properties of the polypropylene compositions are reported in Table 1 below.

TABLE 1

|  | Comparative example 4 | Example 1 | Example 2 | Example 3 |
|---|---|---|---|---|
| Melt flow index PPR1 (g/10 min) | 28 | 36 | 48 | 49 |
| Ethylene content PPR1 [a] (wt %) | 2.2 | 1.4 | 1.1 | 0.9 |
| % PPR1 in PP composition | 66 | 65 | 67 | 69 |
| Ethylene content PPR2 [b] (wt %) | 2.2 | 3.3 | 3.4 | 3.9 |
| Melt flow index PPR2 (g/10 min) | 27 | 25 | 19 | 20 |
| Split in ethylene distribution [d] | 0 | +1.9 | +2.3 | +3.0 |
| Melt flow index of PP composition [c] (g/10 min) | 26 | 23 | 26 | 28 |
| Ethylene content total (wt %) | 2.2 | 2.1 | 1.9 | 1.8 |
| Xylene soluble fraction (wt %) | 1 | 0.8 | 0.9 | 0.7 |
| Haze (%) | 6.5 | 8.1 | 8.8 | 13.3 |
| Flexural Modulus (MPa) | 1190 | 1199 | 1254 | 1250 |
| Izod 23° C. (kJ/m$^2$) | 4.1 | 3.9 | 3.8 | 3.6 |
| Constraint at yield (MPa) | 30.1 | 30.6 | 31.8 | 31.9 |
| Elongation at break (%) | 500 | >500 | >500 | >500 |

[a] PPR1 is the first polypropylene random copolymer, [b] PPR2 is the second polypropylene random copolymer, [c] PP composition is the polypropylene composition comprising PPR1 and PPR2; [d] Split in ethylene distribution = ethylene content of PPR2-ethylene content of PPR1.

The mechanical properties of the polypropylene compositions according to the present invention (Examples 1-3) were improved when the ethylene content in each polypropylene is different instead of being the same (see Comparative example 4). Indeed, the flexural modulus, the constraint at yield and the elongation at break of the polypropylene compositions according to the present invention were enhanced compared to the polypropylene composition of the comparative example 4.

Furthermore, the haze values were lower than 13% for the polypropylene compositions according to the present invention. Izod impact strength values for the polypropylene compositions according to the present invention ranges from 3.6 to 3.9 kJ/m$^2$.

It was also observed that Tm and Tc were increased with the increase in the split in ethylene distribution. Table 2 reported the melting and crystallization temperatures of polypropylene compositions according to the present invention and of polypropylene composition according to the comparative example 4. Polypropylene compositions of examples 5-6 according to the present invention were prepared according to the same polymerization procedure above-described for examples 1 to 3.

TABLE 2

|  | Comp. Ex. 4 | Ex. 2 | Ex. 5 | Ex.3 | Ex. 6 |
|---|---|---|---|---|---|
| Ethylene content PPR1 (wt %) | 2.2 | 1.1 | 0.9 | 0.9 | 0.7 |
| % PPR1 in PP composition | 66 | 67 | 65 | 69 | 70 |

TABLE 2-continued

|  | Comp. Ex. 4 | Ex. 2 | Ex. 5 | Ex.3 | Ex. 6 |
|---|---|---|---|---|---|
| Ethylene content PPR2 (wt %) | 2.2 | 3.4 | 3.5 | 3.9 | 5.1 |
| Split in ethylene distribution | 0 | +2.3 | +2.6 | +3.0 | +4.4 |
| Ethylene content total (wt %) | 2.2 | 1.9 | 1.8 | 1.8 | 2 |
| Melting temperature (° C.)$^a$ | 137 | 144 | 146 | 146 | 149 |
| Crystallization temperature (° C.)$^b$ | 106 | 111 | 112 | 117 | 118 |

$^a$determined by DSC at 20° C./min; $^b$determined by DSC at 20° C./min

The increase of the crystallization temperature is of utmost importance to reduce the cycle time of polypropylene injection-moulding resins. Indeed, the crystallization temperature of example 6 (having a split in ethylene distribution of +4.4) was 12° C. higher than the crystallization temperature of the comparative example 4. In injection-moulding machines, the polypropylene resin is melted at temperatures around 250° C. and cooled to a temperature lower than the crystallization temperature before being ejected from the machines. By using polypropylene resins having higher crystallization temperature, the time needed to cool the resins after injection will be lowered which allows the increase of the productivity. Hence, higher crystallisation temperature favours the processability, mainly the throughput and also improves the rigidity of the polypropylene composition without negatively affecting impact and haze properties.

Examples 1 to 6 and comparative example 4 contain the same additive package and just differ by the polypropylene composition. Examples were carried out in presence of 1850 ppm of DMDBS (Milled® 3988i) which is a clarifying agent.

The invention claimed is:

1. A polypropylene composition (PPR) comprising:
(A) a first polypropylene homopolymer or random copolymer (PPR1) having a comonomer content from 0 to lower than the comonomer content of the second polypropylene,
(B) a second polypropylene (PPR2) which is a random copolymer of propylene and of the comonomer;
wherein:
the polypropylene composition has a total comonomer content ranging from 0.25 to 4.5 wt % based on the total weight of the polypropylene composition,
the comonomer is selected from the group consisting of ethylene, butene-1, pentene-1, hexene-1 and 4-methyl-1-pentene,
the melting temperature, measured by DSC based on ISO 3146, of the polypropylene composition ($T_m$(PPR)) is defined as $T_m$(PPR)>165−6.9×[total comonomer content]−8.4× [comonomer content of the first polypropylene], the difference between the melting temperature and the crystallization temperature, both measured by DSC, of the polypropylene composition ranges from 27 to 33,
a xylene soluble fraction (XS) of not more than 1.5 wt %, and wherein the polypropylene composition has a melt flow index ranging from 20 to 200 g/10 min, the values of melt flow index being measured according to ISO 1133 at (230° C., under a 2.16 kg load), and
a regiodefects content ranging from 0.1% to 5%.

2. A polypropylene composition according to claim 1 wherein the comonomer is ethylene.

3. A polypropylene composition according to claim 1 wherein the melt flow index of the first polypropylene is greater than the melt flow index of the second polypropylene; the values of melt flow index being measured according to ISO 1133 (230° C., 2.16 kg load).

4. A polypropylene composition according to claim 1 wherein the melt flow index of the first polypropylene has a melt flow index ranging from 1 to 200 g/10 min and the second polypropylene has a melt flow index ranging from 1 to 200 g/10 min.

5. A polypropylene composition according to claim 1 having a flexural modulus greater than 1000 MPa, the flexural modulus being measured at 23° C. according to ISO 178.

6. A polypropylene composition according to claim 1 having notched Izod impact strength between 3.0 and 4.0 kJ/m$^2$.

7. A process for the preparation of the polypropylene composition comprising the steps of:
(i) providing a first polypropylene having a comonomer content from 0 to lower than the comonomer content of the second polypropylene,
(ii) providing a second polypropylene which is a random copolymer of propylene and of the comonomer,
(iii) recovering the polypropylene composition having a total comonomer content ranging from 0.25 and 4.5 wt % based on the total weight of the polypropylene composition,
wherein steps (i) and (ii) are carried out by polymerizing propylene and, if any, the comonomer in presence of a metallocene-based polymerization catalyst, wherein the polypropylene composition comprises:
(A) a first polypropylene homopolymer or random copolymer (PPR1) having a comonomer content from 0 to lower than the comonomer content of the second polypropylene,
(B) a second polypropylene (PPR2) which is a random copolymer of propylene and of the comonomer;
wherein:
the polypropylene composition has a total comonomer content ranging from 0.25 to 4.5 wt % based on the total weight of the polypropylene composition,
the comonomer is selected from the group consisting of ethylene, butene-1, pentene-1, hexene-1 and 4-methyl-1-pentene,
the melting temperature, measured by DSC based on ISO 3146, of the polypropylene composition ($T_m$(PPR)) is defined as $T_m$(PPR)>165−6.9×[total comonomer content]−8.4× [comonomer content of the first polypropylene], the difference between the melting temperature and the crystallization temperature, both measured by DSC, of the polypropylene composition ranges from 27 to 33,
a xylene soluble fraction (XS) of not more than 1.5 wt %, and wherein the polypropylene composition has a melt flow index ranging from 20 to 200 g/10 min, the values of melt flow index being measured according to ISO 1133 at (230° C., under a 2.16 kg load), and
a regiodefects content ranging from 0.1% to 5%.

8. A process according to claim 7 wherein the comonomer content of the first polypropylene is lower than 3.5 wt % based on the total weight of the first polypropylene.

9. A process according to claim 8, wherein the comonomer content of the second polypropylene is greater than 1.5 wt % and is at most 8.0 wt %, preferably ranges from 1.5 to 6.0 wt % based on the total weight of the second polypropylene.

10. A process according to claim 8 wherein step (iii) is carried out by blending the first polypropylene and the second polypropylene or by mixing the first polypropylene to the second polypropylene simultaneously to the preparation thereof.

11. An article comprising a polypropylene composition according to claim 1.

12. A method comprising using the polypropylene composition according to claim 1 for the production of films or moulded articles.

* * * * *